United States Patent
Galbraith et al.

(10) Patent No.: US 9,437,232 B1
(45) Date of Patent: Sep. 6, 2016

(54) MAGNETIC RECORDING DISK DRIVE WITH WRITE POSITION ERROR SIGNAL VALUES WRITTEN IN THE DATA TRACKS FOR COMPENSATION OF TRACK MISREGISTRATION

(71) Applicant: HGST Netherlands B.V., Amsterdam (NL)

(72) Inventors: Richard Leo Galbraith, Rochester, MN (US); Weldon Mark Hanson, Rochester, MN (US); Roger William Wood, Gilroy, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/800,444

(22) Filed: Jul. 15, 2015

(51) Int. Cl.
*G11B 5/58* (2006.01)
*G11B 5/596* (2006.01)

(52) U.S. Cl.
CPC ....... *G11B 5/59627* (2013.01); *G11B 5/59688* (2013.01)

(58) Field of Classification Search
CPC ......... G11B 5/58; G11B 5/584; G11B 6/488; G11B 5/59633; G11B 5/59688; G11B 5/59627; G11B 5/012; G11B 5/5547; G11B 21/083
USPC ....... 360/31, 73.12, 77.01, 76, 77.05, 77.06, 360/77.07, 77.08, 78.14
See application file for complete search history.

(56) References Cited

U.S. PATENT DOCUMENTS

| | | | |
|---|---|---|---|
| 5,825,578 A | 10/1998 | Shrinkle et al. | |
| 6,108,159 A | 8/2000 | Nute et al. | |
| 6,417,980 B1 | 7/2002 | Liu et al. | |
| 7,009,805 B2 | 3/2006 | Wong et al. | |
| 7,019,933 B2* | 3/2006 | Iseri ..................... | G11B 21/106 360/51 |
| 7,433,149 B1 | 10/2008 | Gostling | |
| 7,688,535 B2 | 3/2010 | Erden et al. | |
| 8,902,534 B2 | 12/2014 | Brockie et al. | |

OTHER PUBLICATIONS

Hanson, "A head-positioning system using buried servos", Magnetics, IEEE Transactions on (vol. 17, Issue: 6), pp. 2735-2738.

* cited by examiner

*Primary Examiner* — Nabil Hindi
(74) *Attorney, Agent, or Firm* — Thomas R. Berthold (57) ABSTRACT

A hard disk drive is adapted to take the most recent estimated read head positions (the position error signal or PES values) that are obtained during writing and write those values into the data sectors as written PES (WPES) values. The WPES values are available on readback for use as a predictor of the positions in which subsequent data sectors were written and are also available for use in a data recovery procedure should a particular data sector fail to be recovered. In two-dimensional magnetic recording, the difference between the WPES value and the read PES value is a quantity required to rapidly select the best 2D equalizer. The PES values may be encoded prior to being written into the data sectors. The WPES values are appended to the data sectors after the preamble and sync fields, which occur after every servo sector.

20 Claims, 8 Drawing Sheets

MAGNETIC RECORDING DISK DRIVE WITH WRITE POSITION ERROR SIGNAL VALUES WRITTEN IN THE DATA TRACKS FOR COMPENSATION OF TRACK MISREGISTRATION

BACKGROUND OF THE INVENTION

1. Field of the Invention

This invention relates generally to magnetic recording hard disk drives (HDDs), and more particularly to a HDD with compensation for track misregistration (TMR).

2. Description of the Related Art

HDDs typically have disks with data tracks with a fixed track spacing or pitch that is set during manufacturing and cannot be changed during the life of the HDD. The positioning of the read/write heads to the data tracks is accomplished by servo tracks that have angularly-spaced servo sectors that contain head positioning information. The servo sectors extend radially across the data tracks. The read head detects the positioning information as the disk rotates and passes the position information to a servo control system to maintain the head on the desired data track. The servo tracks also have a fixed track pitch that is set during manufacturing and that may be different from the fixed track pitch of the data tracks.

A read head following a particular position with respect to a servo track during writing may be subject to various disturbances, such as internal and external vibration. This may cause the write head to be off track when the data sectors are written in the data tracks. During readback this results in a misalignment between the read head position and the position where the data track was actually written. This is true even if the read head is in its ideal position with respect to the servo track. This discrepancy between written position and the read head positioning during readback is referred to as track misregistration (TMR). TMR results in readback data errors and is a major detractor from achieving the highest possible areal densities and high throughput in modern HDDs. The data errors may possibly be recoverable in a re-read of the data, but this increases the time to retrieve the data; or they may not be recoverable, resulting in hard errors.

What is needed is a magnetic recording disk drive that compensates for TMR during readback.

SUMMARY OF THE INVENTION

Embodiments of this invention relate to a HDD that is adapted to take the most recent estimated read head positions (the PES values) that are obtained during writing and write those values into the data sectors as written PES (WPES) values. This additional position information is available on readback for use as a predictor of the positions in which subsequent data sectors were written and is also available for use in a data recovery procedure (DRP) should a particular data sector fail to be recovered. Also, in two-dimensional magnetic recording (TDMR), the difference between the WPES value and the read PES value is a quantity required to rapidly select the best 2D equalizer and to enable electronic tracking.

The PES values may be encoded prior to being written into the data sectors, for example by used of a repetition code, a Reed-Muller code or a combination of a repetition code and a Reed-Muller code. During readback, the WPES values are read and decoded and may be used with the PES values read during readback to maintain the read head on track. A robust encoding enables the WPES values to be read even if the read head is significantly off track. In the preferred embodiment the PES value from each servo sector is written as the WPES value into the next data sector that occurs after the servo sector. The WPES values are preferably appended to the data sectors after the preamble and sync fields, which occur after every servo sector, so that when the WPES values are later detected they are in synchronization with the servo sectors.

For a fuller understanding of the nature and advantages of the present invention, reference should be made to the following detailed description taken together with the accompanying figures.

DETAILED DESCRIPTION OF THE INVENTION

Figure 1:
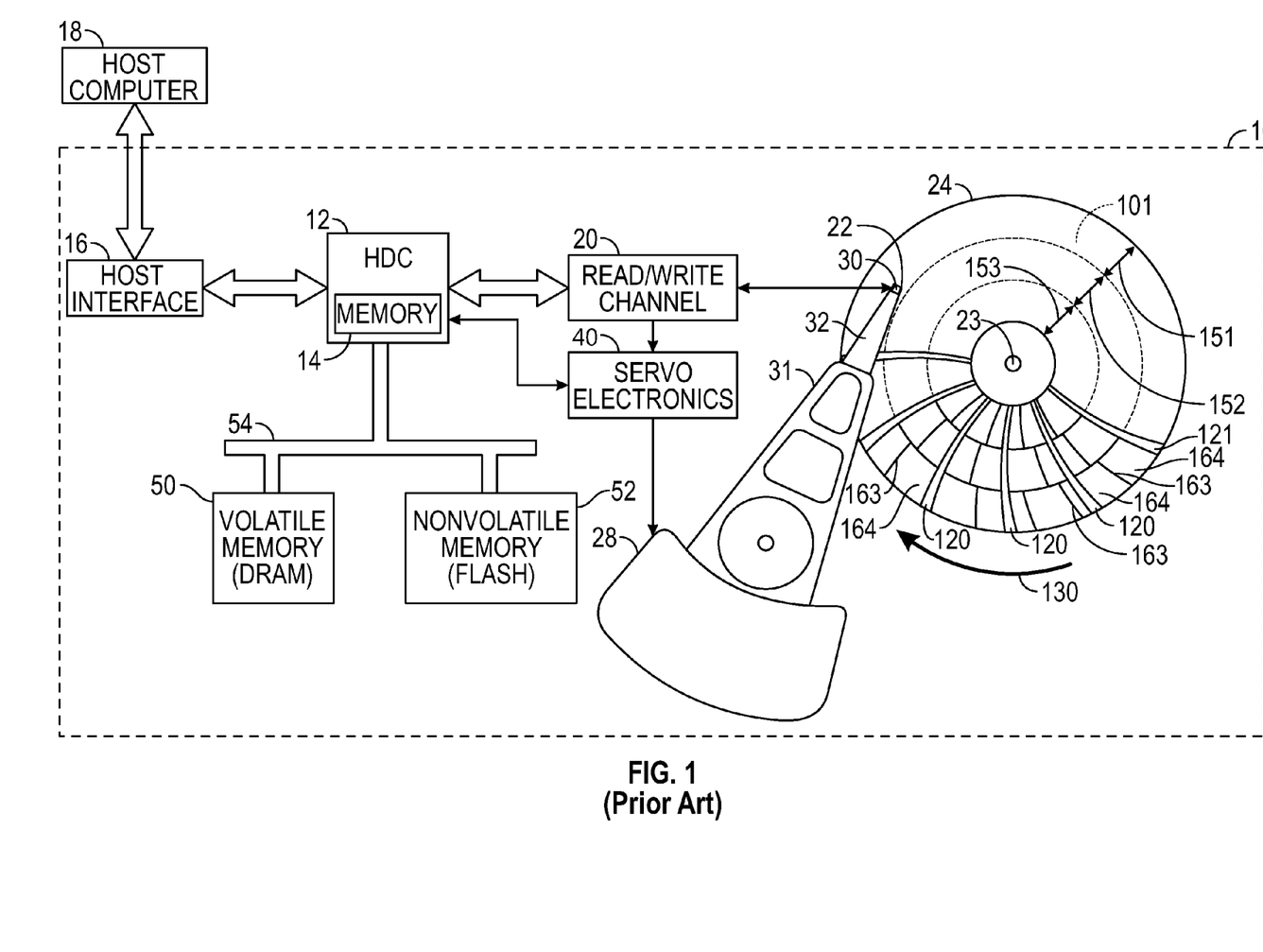
FIG. 1 is a block diagram of a magnetic recording disk drive (HDD) according to the prior art.

FIG. 1 is a block diagram of a magnetic recording disk drive (HDD) 10 according to the prior art. The HDD 10 includes a hard disk controller (HDC) 12 that can include and/or be implemented by a microcontroller or microprocessor. The controller 12 runs a computer program that is stored in semiconductor memory 14 and that embodies the logic and algorithms described further below. The memory 14 may be separate from controller 12 or as embedded memory on the controller chip. The computer program may also be implemented in microcode or other type of memory accessible to the controller 12.

The controller 12 is connected to a host interface 16 that communicates with the host computer 18. The host interface 16 may be any conventional computer-HDD interface, such as Serial ATA (Advanced Technology Attachment) or SAS (Serial Attached SCSI).

While the top view of FIG. 1 shows only a single disk 24 and associated read/write head 22, the HDD 10 typically includes a stack of disks that are mounted on a spindle 23 and rotated by a spindle motor (not shown), with each disk surface being associated with one of the heads 22. The read/write head 22 is typically a combination of an inductive write head with a magnetoresistive read head and is located on the trailing end or end face of a head carrier or slider 30. Slider 30 is supported on the actuator arm 31 by a suspension 32 that enables the slider to "pitch" and "roll" on an air-bearing generated by the disk 24 as it rotates in the direction of arrow 130. The actuator arm 31 is attached to a rotary voce coil motor (VCM) actuator 28 that rotates about pivot 29. Thus as the actuator 28 pivots, the path of slider 30 with attached read/write head 22 is not aligned with a disk radius, but is an arcuate path (like that shown by servo sectors 120 described below).

The disk 24 has a magnetic recording layer that includes radially-spaced concentric data tracks with a fixed track spacing or track pitch (TP). The HDD 10 is illustrated as a zone-bit-recording (ZBR) HDD because the data tracks are grouped radially into a number of annular data bands or zones, three of which are shown as zones 151, 152 and 153, but the invention is fully applicable to a HDD that does not use ZBR, in which case the HDD would have only a single data zone. Within each zone, the tracks are also circumferentially divided into a number of contiguous physical data sectors, such as typical data sectors 164 in the radially outer data zone 151. Each data sector 164 is preceded by a synchronization (sync) field, such as typical sync fields 163. The sync fields 163 are detectable by the read head for enabling synchronization of reading and writing in the data sectors 164.

The disk also includes radially-spaced concentric servo tracks that have a fixed track spacing or pitch (TP) that is typically different from the TP of the data tracks. Because the data TP and servo TP are different, there is not a one-to-one relationship of data tracks to servo tracks, so the radial position of each data track is identified by its nearest servo track plus an offset from that servo track. The servo tracks are not continuous but are formed as a group of angularly-spaced servo sectors 120. The servo sectors 120 contain position error signal (PES) blocks detectable by the read head for moving the head 22 to desired data tracks and maintaining the head 22 on the data tracks. The servo sectors in each servo track are aligned circumferentially with the servo sectors in the other servo tracks so that they extend across the servo tracks in a generally radial direction, as represented by radially-directed servo sectors 120. The servo sectors 120 are nondata regions on the disk that are magnetized once, typically during manufacturing or formatting of the disk, and are not intended to be erased during normal operation of the HDD. Each of the servo sectors 120 in a servo track typically contains a servo timing mark (STM) that indicates the start of the servo sector, a servo track identification (TID) code, and a portion of a pattern of magnetized blocks or high-frequency bursts that form head position error signal (PES) fields. The PES fields are detected by the read head and decoded to provide a PES value, which is a measure of how far the head is off track from the data track centerline.

Referring again to FIG. 1, the electronics associated with HDD 10 also includes servo electronics 40. In the operation of HDD 10, the read/write channel 20 receives signals from head 22 and passes servo information from the servo sectors 120 to servo electronics 40 and data signals from the data sectors 164 to controller 12. Servo electronics 40 typically includes a servo control processor that uses the PES information from the servo sectors 120 to run a servo control loop that produces a control signal representative of head radial position. The control signal is converted to a current that drives actuator 28 to position the head 22. In modern disk drives, the functions of the interface 16, HDC 12 with memory, read/write channel 20 and servo electronics 40 may be included in a single system on a chip (SOC) that also includes the necessary processors, software and hardware to perform those functions.

In the operation of HDD 10, interface 16 receives a request from the host computer 18 for reading from or writing to the data sectors 164. Controller 12 receives a list of requested data sectors from interface 16 and converts them into a set of numbers that uniquely identify the disk surface, data track and data sector. The data track number is used to extract from a table the number of the servo track closest to the desired data track and the amount of radial offset of the data track from that servo track. The numbers are passed to servo electronics 40 to enable positioning head 22 to the appropriate data sector 164. The servo control system enables the head used for reading and writing to be spatially aligned within a fraction of a track-pitch in the radial direction of the disk.

The controller 12 acts as a data controller to transfer blocks of write data from the host computer 18 through the read/write channel 20 for writing to the disks 24 by the heads 22, and to transfer blocks of read data from the disks 24 back to the host computer 18. HDDs typically include, in addition to the rotating disk storage, solid-state memory (referred to as "cache") that temporarily holds data before it is transferred between the host computer and the disk storage. The conventional cache is dynamic random access memory (DRAM), a volatile form of memory that can undergo a significant number of write/erase cycles and that has a high data transfer rate. HDDs may also include nonvolatile memory. One type of nonvolatile memory is "flash" memory, which stores information in an array of floating gate transistors, called "cells" which can be electrically erased and reprogrammed in blocks. Thus in HDD 10, the controller 12 also communicates with volatile memory 50 (shown as DRAM) and optional nonvolatile memory 52 (shown as FLASH) via data bus 54.

The HDD 10 may also be a HDD that uses "shingle writing", also called "shingled recording" or "shingled magnetic recording" (SMR). SMR HDDs are well-known, for example as described in U.S. Pat. No. 6,185,063 B1 and U.S. Pat. No. 6,967,810 B2. In SMR, the write head, which is wider than the read head in the cross-track direction, writes magnetic transitions by making a plurality of consecutive circular paths that partially overlap. The non-overlapped portions of adjacent paths form the shingled data tracks, which are thus narrower than the width of the write head. The data is read back by the narrower read head. The narrower shingled data tracks thus allow for increased data density. The shingled data tracks are arranged on the disk as annular bands separated by annular inter-band gaps or guard bands.

Figure 2:
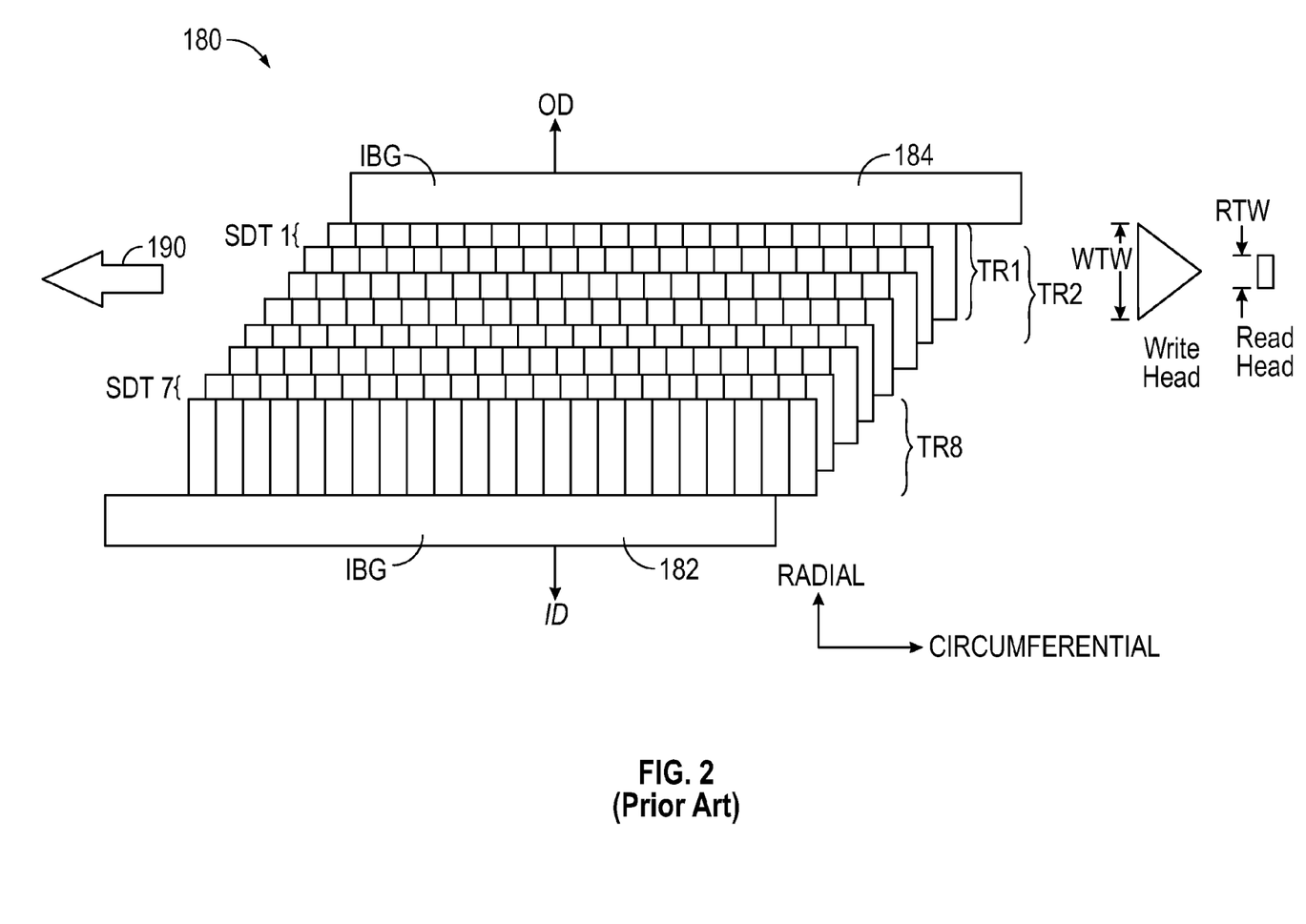
FIG. 2 is a schematic of a shingled region or band of a disk for describing the method of operation of a shingled magnetic recording (SMR) HDD.
Figure 3:
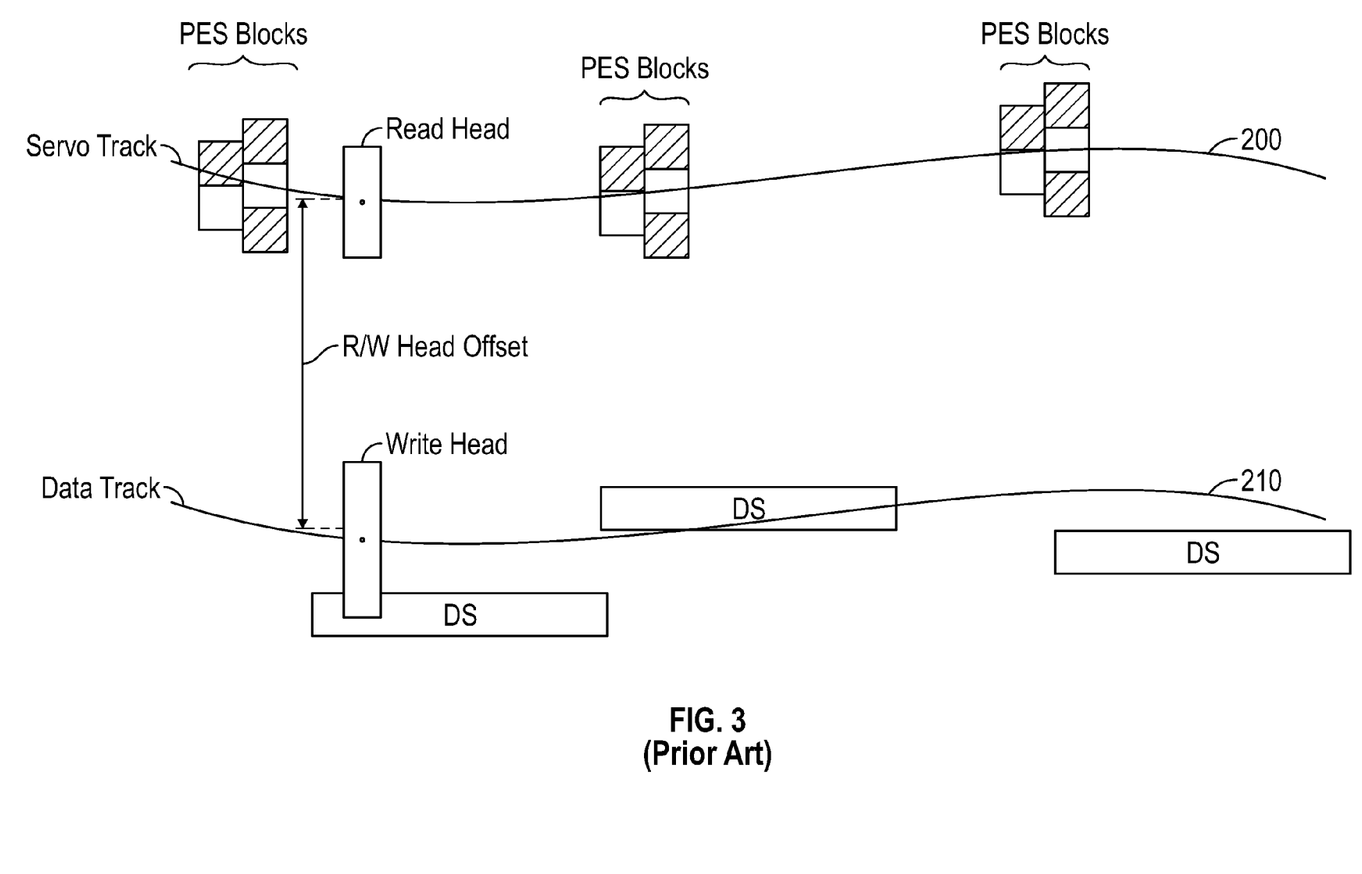
FIG. 3 is a schematic depicting a portion of a servo track and a data track, with the read head following the servo track while the write head is writing to the data track.

FIG. 2 is a schematic of a shingled region or band 180 for use in describing the method of SMR. A typical band will have a large number, i.e., several hundred or thousand, shingled data tracks (SDTs); however only 7 are shown in band 180 for ease of illustration. Band 180 has inter-band gaps (IBGs) 182, 184 that separate it from radially adjacent bands. The write head makes successive paths or tracks (TRs) to form the SDTs, which in the example of FIG. 3 are written in the direction from disk outside diameter (OD) to disk inside diameter (ID). The write pole tip of the write head has a cross-track width (WTW) that is wider than the sensing edge of the read head cross-track width (RTW). When writing data, the write head generates paths of magnetic transitions, represented by the vertical lines, as the recording layer moves in the direction of arrow 190. For example, the actuator positions the write head to write data along track 1 (TR1), then moves the write head to write data along track 2 (TR2). The writing of data along TR2 overwrites a portion of the previously written TR1 and thus "squeezes" the data of TR1 to thereby form the first shingled data track (SDT1). In the example of FIG. 2, the shingled data tracks are written in the direction from the disk OD to ID. However, a disk drive can be formatted such that writing of the shingled data tracks in one or more bands can be from ID to OD, with different bands being written in different directions. SMR HDDs also have servo tracks with servo sectors, and data tracks with a TP different from the TP of the servo tracks.

Track misregistration (TMR) is a major detractor from achieving the highest possible areal densities and high throughput in modern HDDs. The result of TMR is that during readback the data cannot be detected, resulting in readback data errors. The data errors may possibly be recoverable in a re-read of the data, but this increases the time to retrieve the data; or they may not be recoverable, resulting in hard errors. TMR occurs because during writing, when the read head is detecting the PES blocks to follow a servo track, disturbances such as internal and external vibration will cause the write head to move off track.

FIG. 3 is a schematic depicting a portion of a servo track and a data track, with the read head following the servo track while the write head is writing to the data track. The path 200 represents the ideal path the read head should follow along the servo track to maintain the write head on the desired data track. Path 200 is shown as being the center of a servo track, but it could be some location or offset between adjacent servo tracks. Path 200 includes multiple servo sectors, each with PES blocks, and is depicted as other than a straight line to reflect runout. The write head has a cross-track offset from the read head and ideally would write each data sector (DS) along a path 210 that would replicate the path 200 of the read head. However, disturbances during writing will cause the read head to deviate from path 200. This will cause the data sectors to be written off track, i.e., other than precisely on path 210, as shown in FIG. 3.

Embodiments of this invention relate to a HDD that is adapted to take the most recent estimated read head positions (the PES values) that are obtained during writing and write those values into the data sectors as written PES (WPES) values. This additional position information is available on readback for use as a predictor of the positions in which subsequent data sectors were written and is also available for use in a data recovery procedure (DRP) should a particular data sector fail to be recovered. Also, in two-dimensional magnetic recording (TDMR), the difference between the WPES value and the read PES value is a quantity required to rapidly select the best 2D equalizer and to enable electronic tracking.

Figure 4:
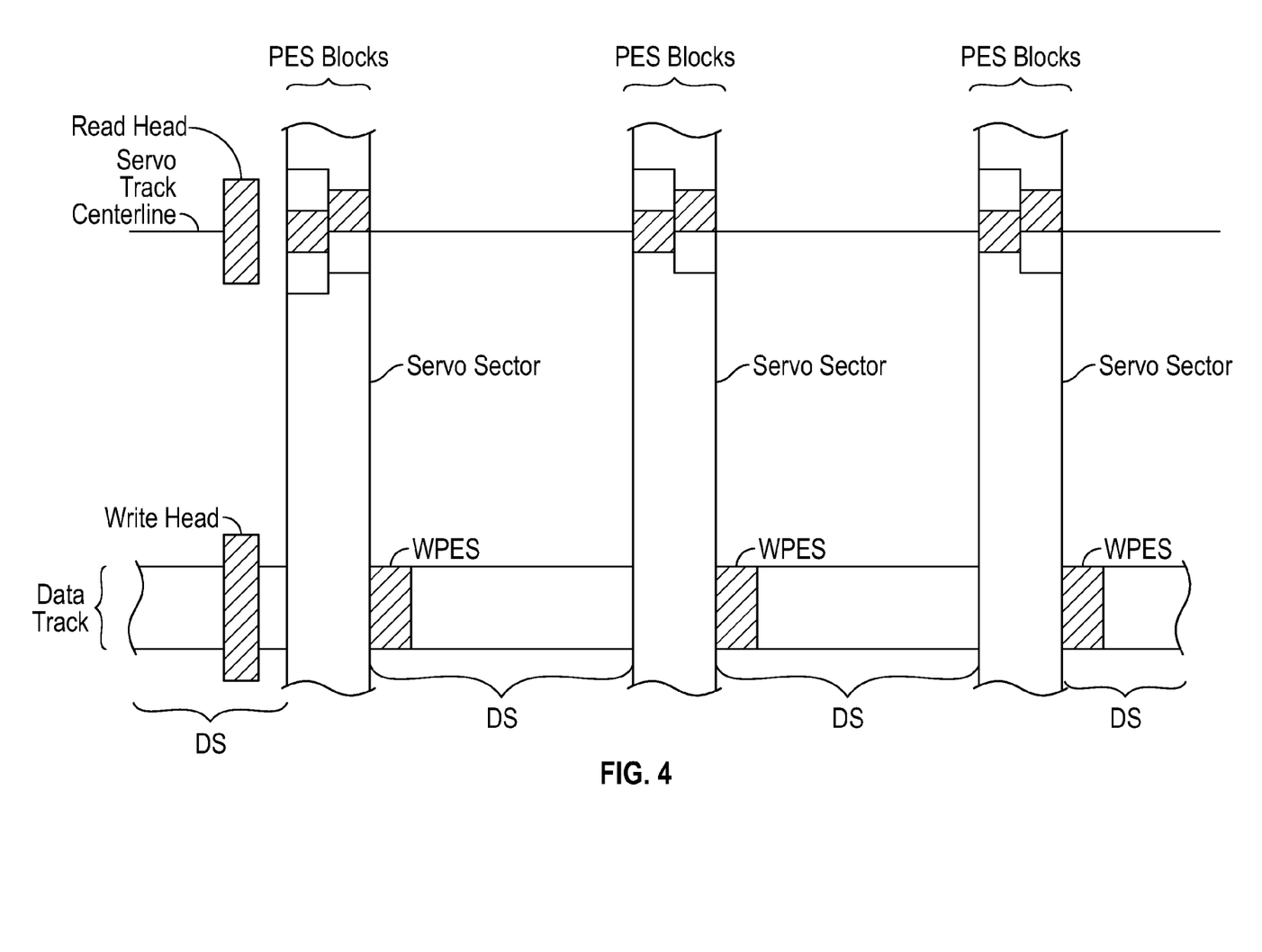
FIG. 4 is a schematic of the read head and write head to illustrate the method of detecting the position error signal (PES) blocks with the read head and writing the write PES (WPES) values into the data sectors with the write head according to embodiments of the invention.
Figure 5:
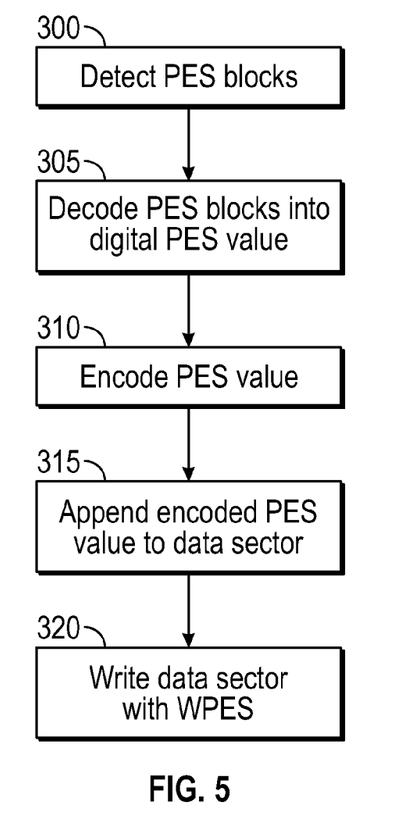
FIG. 5 is a flow chart of the method of detecting the PES blocks with the read head and writing the WPES values into the data sectors with the write head according to embodiments of the invention.

FIG. 4 is a schematic of the read head and write head to illustrate the method of detecting the PES blocks in a servo sector with the read head and writing the WPES value into the data sector (DS) with the write head, and FIG. 5 is a flow chart for explaining the method. Referring to FIG. 4, during the writing of data to the data track, the read head is following a servo track (i.e., the path made by the angularly-spaced servo sectors) that is radially spaced from the data track where the write head is located. In FIG. 5, at block 300 the read head detects the PES blocks in a servo sector and at block 305 the read/write electronics decodes the detected PES blocks into a digital PES value that represents the amount of offset of the read head from the servo track centerline at that servo sector. In one embodiment this PES value is incorporated into the customer data that is to be written into the data sector, for example as a 4, 6 or 8 bit word, and written into the data sector as the WPES along with the customer data, preferably at the beginning of the data sector. For example, 8 bits of WPES can be included in customer data and covered by the full strength of the existing low-density parity code (LDPC) and detector in the read/write electronics. In the preferred embodiment the PES value is encoded (block 310 in FIG. 5) and then appended to the customer data in a special field separate from the customer data at block 315. The encoded PES value is then written as the WPES at block 320 as a separate field, preferably at the beginning of the data sector. In FIG. 5 there is one data sector depicted for each servo sector for ease of illustration. However, the number of data sectors per track will typically be different at different annular bands on the disk, while the number of servo sectors per track is typically the same for all tracks on the disk. In the preferred embodiment the PES value from each servo sector is written as the WPES into the next data sector that occurs after the servo sector. However, the method may also function if less than all servo sectors are used, for example use of the PES values from every other servo sector may be sufficient.

Figure 6:
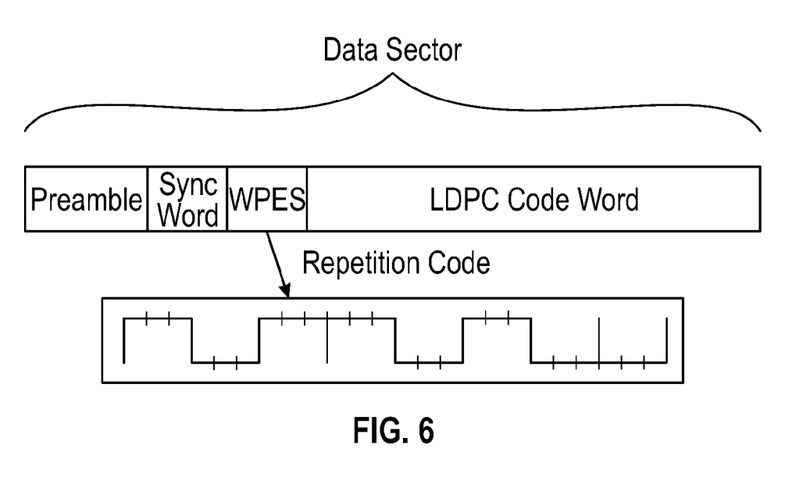
FIG. 6 is a schematic illustrating a data sector with conventional preamble, sync word and customer data with the WPES located in a special field according to an embodiment of the invention.

FIG. 6 is a schematic illustrating a data sector with conventional customer data (encoded as LDPC) with conventional data sector preamble and sync word. The WPES is located in a special field preceding the LDPC code word. The WPES may be encoded by a robust code, like a repetition code, that provides very fast decoding. Simple 2× or 3× repetition codes are well-known and capable of very fast decoding, such as by simple programmable modification of a Pattern Dependent Noise Prediction (PDNP) Viterbi detector or a soft output Viterbi algorithm (SOVA) such as currently used in the read channel to detect customer data. Other options for providing very robust detection include writing the WPES several times into the data sector and taking a majority vote or averaging the resulting waveforms to reduce noise. Another alternate technique is to use a very powerful low-rate code such as a Reed-Muller (RM) code. For example, an RM(16,5,8) can encode 5 bits of WPES into 16 channel bits and ensure a Hamming distance of 8 between all 2^5=32 values of WPES. Furthermore, such techniques can be combined. The RM(16,5,8) code and a repetition code 3 can be combined, giving a total length of 48 bits. With such an extremely powerful code, WPES can be recovered even with the read head as much as 50% of a track pitch away from the center of the written track. In the preferred embodiment, as shown in FIG. 6, the WPES is available immediately after the preamble and sync word, which themselves are designed to be very robust. The preamble and sync fields occur at the beginning of every data sector, and also immediately after every servo sector in order to re-sync the data after the servo interruption. This WPES location immediately after the preamble and sync fields is a very convenient location because the WPES information is then delivered to the servo electronics in synchronization with the servo sectors.

Figure 7:
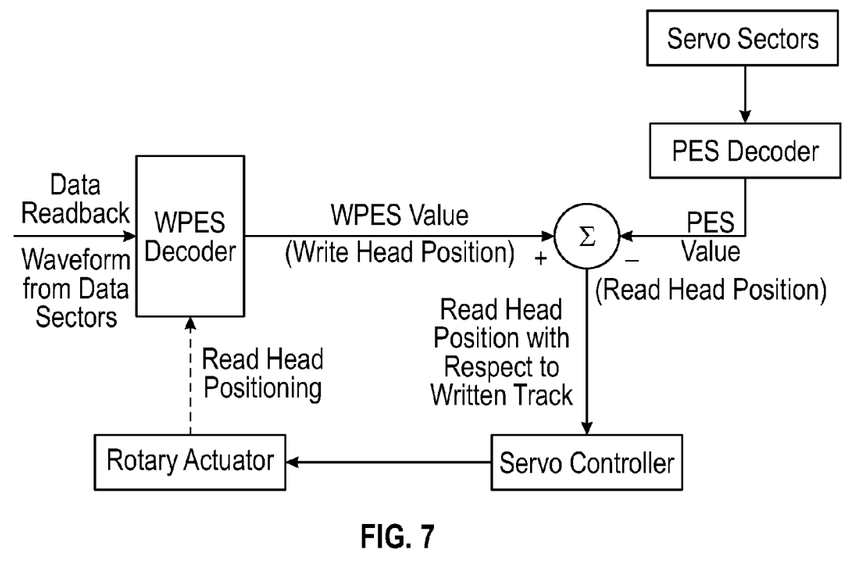
FIG. 7 is a block diagram explaining how the WPES is used in the servo loop for read head tracking during data readback according to an embodiment of the invention.

FIG. 7 is a block diagram explaining how the WPES is used in the servo loop for read head tracking during data readback. The read head is moved to the data track to read the written data. The read head now follows the servo track (the path of the angularly spaced servo sectors) where the data was written, which is a different servo track from the one it followed during writing. As the servo sectors pass the read head, the read head detects the PES blocks which are decoded by the PES decoder into digital PES values. When the read head reads the data sectors between the servo sectors it reads the WPES values, which are decoded by the WPES decoder, for example a repetition code decoder. The WPES values and PES values are then summed at the summing junction to obtain the difference, i.e., WPES-PES. This value is input to the servo controller to control the rotary actuator to reposition the read head and maintain it over the path where the data sectors were actually written. The WPES values are thus used to modify the PES values into the servo controller.

The WPES may also be used in a data recovery procedure (DRP). If a data sector cannot be read but returns a read error, the HDD enters a DRP in which the disk makes another rotation and the data sector is attempted to be re-read on the second rotation. One cause for this read error is that the data sector was written slightly off track due to a disturbance. In that case knowledge of the off-track position (i.e., the WPES value associated with that data sector) may be used to re-position the read head. In an embodiment of this invention the WPES values are read as each data sector passes during the second disk rotation and summed with the PES values decoded from the servo sectors to modify the head position (in the manner as shown and described in FIG. 7). If the write head was off track when the data sector was written, the WPES values will enable the servo control system to re-position the read head so that the data sector can be read on the second disk rotation.

For a SMR HDD it is the position of both track N and the subsequent adjacent track N+1 that together define the final position of the center of what remains of track N after shingled writing. This is because the tracks overlap as a result of the write head being wider than the read head. For example, referring back to the SMR diagram of FIG. 2, the radial positions of track TR1 and track TR2 when written determine the radial position of shingled data track SDT 1. Thus for SMR the track center position for a written track N can be obtained by the average of the WPES read for track N and the WPES read from the adjacent subsequent track, track N+1. In an embodiment of this invention for SMR, the tracks can be read in reverse order to the order in which they were written. The WPES is read from track N+1 and stored, and then the WPES is read from track N and averaged with the WPES from track N+1 to obtain an averaged WPES that represents an estimate of where track N was written.

The WPES values may also be used in a two-dimensional magnetic recording (TDMR) HDD. TDMR is a HDD technology that uses multiple read heads that are located on a single head structure to access the same or adjacent data tracks to obtain signals that are processed jointly. This allows the data tracks to be placed closer together, resulting in an increase in areal data bit density. The technique is two-dimensional in the sense that individual tracks can only be written or read successfully if neighboring tracks are taken into account. A head structure with multiple stacked read sensors for TDMR is described in US 2013/0286502 A1 and in U.S. Pat. No. 8,873,204 B1 which is assigned to the same assignee as this application.

Figure 8:
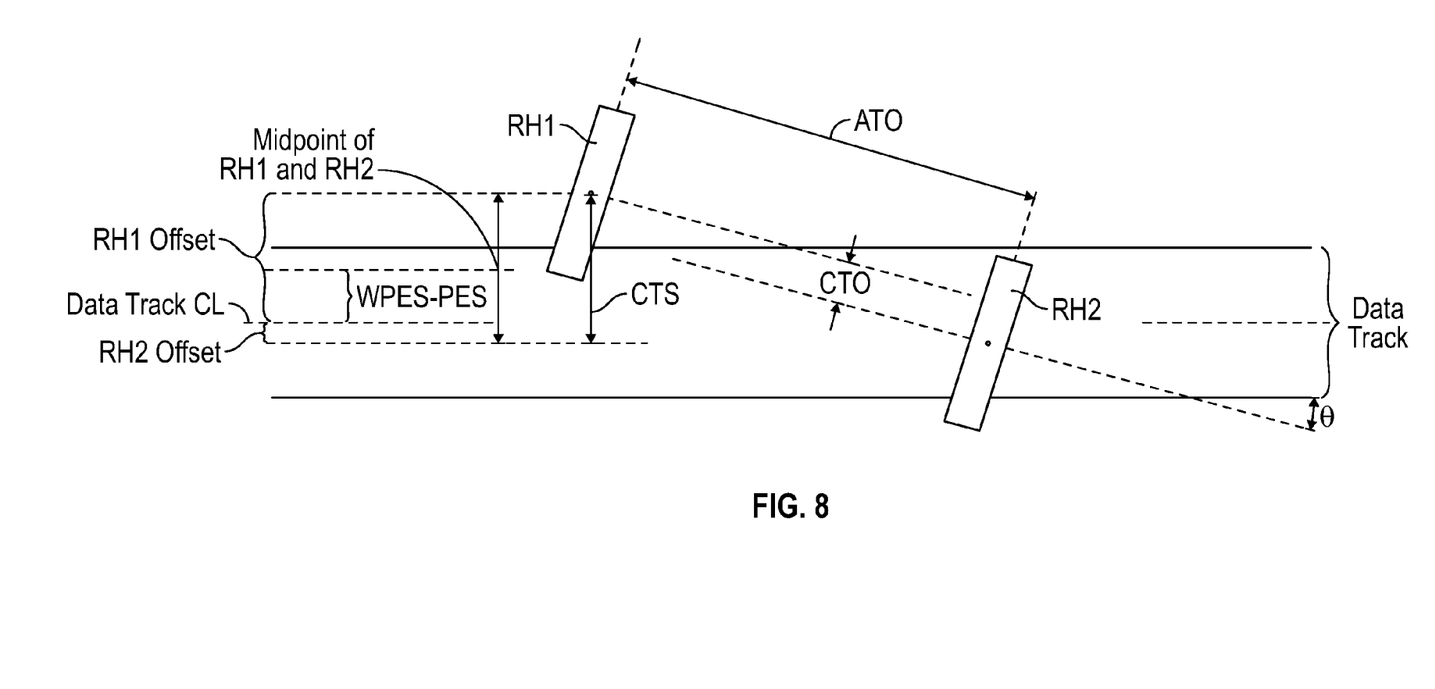
FIG. 8 is a highly schematic illustration of a two-dimensional magnetic recording (TDMR) head structure with two stacked read heads (RH1 and RH2) with a fixed cross-track offset (CTO) and along-the-track (ATO) offset.

In TMDR, one or more of the read heads can be used to follow the servo track during writing. During readback, it is necessary to know the cross-track location of each individual read head with respect to the centerline of the data track. FIG. 8 is a highly schematic illustration of a TDMR head structure with two stacked read heads (RH1 and RH2) with a fixed cross-track offset (CTO) and along-the-track (ATO) offset. As shown in FIG. 8, the heads are at a radial location that results in a non-zero skew angle θ. The skew angle is the angle between a normal to the read heads and the data track centerline (CL). The cross-track spacing (CTS) between RH1 and RH2 is a function of the skew angle θ and is given by the following equation:

$$CTS=(CTO)\cos\theta+(ATO)\sin\theta \qquad \text{Equation (1)}$$

Figure 9:
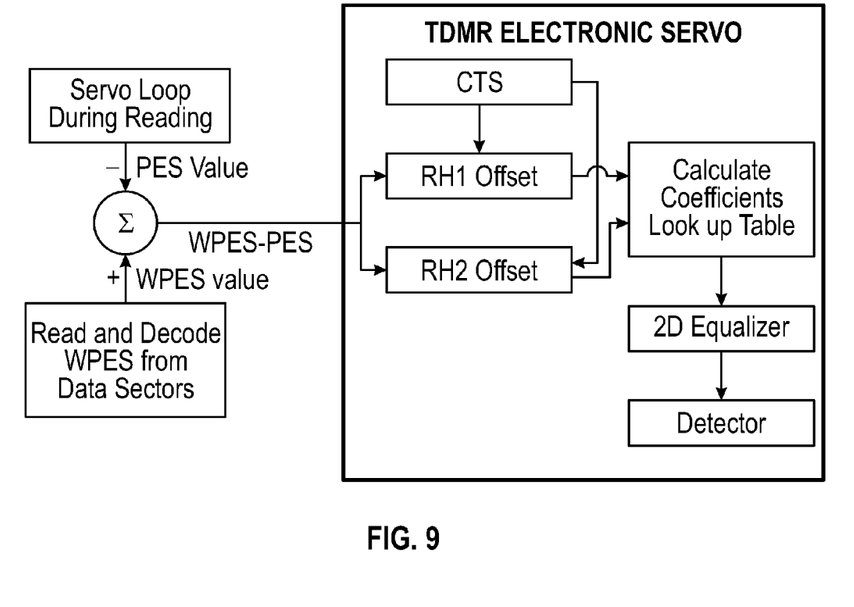
FIG. 9 is a highly schematic portion of a TDMR readback channel with two read heads according to an embodiment of the invention.

FIG. 9 is a highly schematic portion of a TDMR readback channel with two read heads, like the head structure of FIG. 8. The RH1 offset from the track centerline and the RH2 offset from the track centerline are used in a lookup table to generate a set of coefficients, which are then used to select the 2D equalizer. In an embodiment of this invention the WPES values are used to provide and estimate of where the cross-track midpoint of the RH1 and RH2 is when the data sectors were written. The WPES values are read from the data sectors are available immediately after the preamble and are decoded. The read PES values are available from the immediately preceding servo sectors. The difference between these two values (WPES-PES) is the offset between the current midpoint of the read heads and the position where the data sector was written. During reading, the WPES values are summed with the PES values to provide an estimate (WPES-PES) of where the midpoint of RH1 and RH2 is with respect to the centerline of the data track. This WPES-PES value is one parameter needed to determine RH1 offset and RH2 offset. The other parameter is the known cross-track spacing (CTS) between the two read head, which is given by Equation (1). CTS is a variable that is a function of the skew angle, and thus the disk radius, but is known for each data track. Thus the WPES-PES and the CTS are used to calculate the RH1 offset and the RH2 offset in the TDMR readback channel. The RH1 offset and RH2 offset are input into a lookup table to calculate coefficients, which are used to select a pre-computed approximate 2D equalizer design for TDMR. This equalizer needs to be selected and loaded rapidly immediately when the WPES is recovered from the data stream so that almost all the subsequent waveform in the data sector is well equalized going into the detector. If a new read PES becomes available during the readback of the data sectors, the offset values can be updated and new equalizer coefficients loaded.

The operation of the HDD functions as described above may be implemented in hardware or microcode or as a set of computer program instructions stored in memory and executable by a processor, such as the HDC, or a separate controller or microprocessor in the SOC. The controller performs logical and arithmetic operations based on the program instructions stored in memory, and is thus capable of performing the functions described above and represented in the figures.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising;
   a magnetic recording disk comprising
      a plurality of radially spaced data tracks, the data tracks including data sectors;

a plurality of radially spaced servo tracks having a plurality of angularly spaced servo sectors extending across the servo tracks and data tracks, the servo sectors containing position error signal (PES) blocks;

at least one read head for reading data from the data tracks and PES blocks from the servo tracks;

a write head for writing to the data tracks;

a head carrier supporting the read head and write head;

an actuator connected to the carrier for moving the read and write heads radially across the disk;

read/write electronics coupled to the read head and write head for decoding the PES blocks read by the read head into PES values and for causing data to be written into the data sectors by the write head, the read/write electronics being adapted to cause the write head to write PES values into the data tracks when writing data into the data sectors; and servo electronics coupled to the actuator for adjusting the radial position of the read head in a data track in response to the written PES values (WPES values) read by the read head.

2. The disk drive of claim 1 wherein the read/write electronics is adapted to cause the write head to write the WPES values together with the data in the data sectors.

3. The disk drive of claim 1 further comprising an encoder for encoding the PES values prior to writing the PES values as WPES values and a decoder for decoding the encoded WPES values.

4. The disk drive of claim 3 wherein the encoder is adapted to encode a code selected from a repetition code, a Reed-Muller code and a combination of a repetition code and a Reed-Muller code, and the decoder is adapted to decode said selected code.

5. The disk drive of claim 3 wherein the read/write electronics is adapted to append the encoded WPES values to the data sectors.

6. The disk drive of claim 5 wherein the read/write electronics is adapted to append the encoded WPES values at the beginning of the data sectors.

7. The disk drive of claim 5 wherein a preamble field and a sync field are located immediately after each servo sector and wherein the read/write electronics is adapted to append the encoded WPES values immediately after the preamble field and sync field.

8. The disk drive of claim 1 wherein the read/write electronics is adapted to cause the write head to write a WPES value in response to each servo sector read by the read head.

9. The disk drive of claim 1 wherein the servo electronics is adapted to cause the read head to follow a data track by modifying the PES values decoded from the PES blocks in the servo sectors with the WPES values read from the data track.

10. The disk drive of claim 1 wherein the disk drive is a shingled magnetic recording disk drive, wherein the write head has a cross-track width greater than the cross-track width of the read head and the disk has overlapping data tracks, and wherein the read/write electronics is adapted to cause the write head to write PES values into adjacent overlapping data tracks in succession in a first radial direction, and to cause the read head to read the WPES values from adjacent overlapping data tracks in succession in a radial direction opposite said first radial direction.

11. The disk drive of claim 1 wherein the disk drive is a two-dimensional magnetic recording (TDMR) disk drive and wherein the servo electronics is adapted to calculate, from the PES values decoded from the PES blocks and the WPES values, the offset of the read heads from a data track centerline.

12. The disk drive of claim 1 wherein the servo electronics includes a processor for running a servo control loop that receives the decoded PES values from the PES blocks read by the read head from the servo sectors and outputs read head position to the actuator, wherein the processor is adapted to modify said read head position in response to WPES values read by the read head from the data tracks.

13. A two-dimensional magnetic recording (TDMR) disk drive comprising;

a magnetic recording disk comprising a plurality of radially spaced data tracks, the data tracks including data sectors;

a plurality of radially spaced servo tracks having a plurality of angularly spaced servo sectors extending across the servo tracks and data tracks, the servo sectors containing position error signal (PES) blocks;

two read heads for reading data from the data tracks, at least one of the read heads adapted to read PES blocks from the servo tracks;

a write head for writing to the data sectors;

a head carrier supporting the read heads and write head;

an actuator connected to the carrier for moving the read heads and write head radially across the disk;

read/write electronics coupled to the read heads and write head for causing data to be written into the data sectors of a data track by the write head and for decoding the PES blocks read by said at least one read head from a first servo track into PES values while the write head is writing data in the data sectors of said data track, the read/write electronics adapted to cause the write head to write said PES values (WPES values) into the data sectors when writing data into the data sectors of said data track;

an encoder for encoding the PES values into encoded WPES values prior to causing the WPES values to be written into the data sectors of said data track;

a decoder for decoding the encoded WPES values read by the read heads from the data sectors of said data track; and servo electronics coupled to the actuator for moving said at least one read head to a second servo track prior to reading data sectors from said data track, the servo electronics adapted to adjust the radial position of said at least one read head relative to said second servo track when reading said data track in response to the difference between the decoded WPES values from the data sectors in said data track and the PES values decoded from the PES blocks in said second servo track.

14. The disk drive of claim 13 wherein the encoder is adapted to encode a code selected from a repetition code, a Reed-Muller code and a combination of a repetition code and a Reed-Muller code, and the decoder is adapted to decode said selected code.

15. The disk drive of claim 13 wherein the read/write electronics is adapted to append the encoded WPES values to the data sectors.

16. The disk drive of claim 15 wherein the read/write electronics is adapted to append the encoded WPES values at the beginning of the data sectors.

17. The disk drive of claim 15 wherein a preamble field and a sync field are located immediately after each servo sector and wherein the read/write electronics is adapted to append the encoded WPES values immediately after the preamble field and sync field.

18. The disk drive of claim 13 wherein the read/write electronics is adapted to cause the write head to write a WPES value in response to each servo sector read by the read head.

19. The disk drive of claim 13 wherein the TDMR disk drive is a shingled magnetic recording disk drive, wherein the write head has a cross-track width greater than the cross-track width of the read head and the disk has overlapping data tracks.

20. The disk drive of claim 13 wherein the servo electronics is adapted to calculate, from the PES values decoded from the PES blocks and the decoded WPES values, the offset of the read heads from a data track centerline.

* * * * *